(12) United States Patent
Klabjan (10) Patent No.: US 10,467,556 B2
(45) Date of Patent: Nov. 5, 2019

(54) INFORMATION SYSTEMS AND METHODS FOR DEPLOYMENT OF CHARGING INFRASTRUCTURE IN SUPPORT OF ELECTRIC VEHICLES

(75) Inventor: Diego Klabjan, Deerfield, IL (US)

(73) Assignee: Northwestern University, Evanston, IL (US)

( * ) Notice: Subject to any disclaimer, the term of this patent is extended or adjusted under 35 U.S.C. 154(b) by 313 days.

(21) Appl. No.: 13/369,855

(22) Filed: Feb. 9, 2012

(65) Prior Publication Data

US 2012/0203726 A1   Aug. 9, 2012

Related U.S. Application Data

(60) Provisional application No. 61/441,083, filed on Feb. 9, 2011, provisional application No. 61/515,243, filed on Aug. 4, 2011.

(51) Int. Cl.
*G06N 99/00* (2019.01)
*G06Q 10/06* (2012.01)
*B60L 53/63* (2019.01)
*B60L 53/65* (2019.01)
*G06N 5/00* (2006.01)

(52) U.S. Cl.
CPC .............. *G06Q 10/06* (2013.01); *B60L 53/63* (2019.02); *B60L 53/65* (2019.02); *B60L 2260/50* (2013.01); *B60L 2260/54* (2013.01); *G06N 5/00* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ..................................................... G06N 99/00
USPC ..................................................... 706/46, 45
See application file for complete search history.

(56) References Cited

PUBLICATIONS

Tranouez, et al., A Multiagent Urban Traffic Simulation Part I: Dealing with the Ordinary, ICCSA 2009, 2009, pp. 1-5.*
Ip, et al., Optimization for Allocating BEV Recharging Stations in Urban Areas by Using Hierarchical Clustering, Advanced Information Management and Service (IMS), 2010 6th International Conference on, Nov. 30, 2010-Dec. 2, 2010, pp. 460-465.*

(Continued)

*Primary Examiner* — Wilbert L Starks
(74) *Attorney, Agent, or Firm* — Benesch, Friedlander, Coplan & Aronoff LLP (57) ABSTRACT

Certain examples provide systems and methods to identify placement for an electric charging station infrastructure. Certain examples provide systems and methods to generate a deployment plan for one or more electric vehicle charging stations. An example method includes gathering data for a specified geographic area and forecasting a demand for electric vehicles for the specified area. The example method includes modeling driving patterns in the specified area using available data and improving a charging infrastructure model based on the driving pattern and demand forecast information for the specified area. The example method includes generating and providing a recommendation regarding an electric vehicle charging infrastructure and deployment strategy for the specified area based on the improved charging infrastructure model.

20 Claims, 9 Drawing Sheets

(56) References Cited

PUBLICATIONS

Schneider, et al., Innovation Process 'Fuel Cell Vehicle': What Strategy Promises to Be Most Successful?, 9th International Conference of the Society of Computational Economics Computing in Economics and Finance, Jul. 2003, pp. 1-29.*

Ip, et al., Optimization for Allocating BEV Recharging Stations in Urban Areas by Using Hierarchical Clustering, Advanced Information Management and Service (IMS), 2010 6th International Conference on, Nov. 30, 2010-Dec. 2, 2010, pp. 460-465. (Year : 2010).*

* cited by examiner

INFORMATION SYSTEMS AND METHODS FOR DEPLOYMENT OF CHARGING INFRASTRUCTURE IN SUPPORT OF ELECTRIC VEHICLES

CROSS-REFERENCE TO RELATED APPLICATIONS

This patent claims priority to U.S. Provisional Application Ser. No. 61/441,083, entitled "Information Systems and Methods for Deployment of Charging Infrastructure in Support of Electric Vehicles," which was filed on Feb. 9, 2011 and is hereby incorporated herein by reference in its entirety, and U.S. Provisional Application Ser. No. 61/515,243, entitled "Models for Deployment of Charging Stations in Support of Electric Vehicles," which was filed on Aug. 4, 2011, and is also hereby incorporated herein by reference in its entirety.

STATEMENT REGARDING FEDERALLY SPONSORED RESEARCH OR DEVELOPMENT

This invention was made with government support under DTRT06-G-0036 awarded by Department of Transportation. The government has certain rights in the invention.

FIELD OF THE DISCLOSURE

This disclosure relates generally to charging of electric vehicles, and, more particularly, to identification of placement for an electric charging station infrastructure.

BACKGROUND

The world is facing challenging problems due to indiscriminate use of non-renewable energy sources, including petroleum and its derivatives. One issue is that of public and private vehicles, which have been powered by gasoline or diesel-burning vehicles for several decades, thus increasing the high levels of air pollution (green house gases). As a result, the world is hungry for a new environmental attitude and fast solutions. Hence, the electric vehicles (EVs) industry can be considered as a favorable initiative to overcome some of the possible consequences of basing modern society on fuel-powered vehicles.

Mass production electric vehicles (EVs) are coming on to the market during the next few years. Their adoption will depend on the availability of charging stations. A few cities have started deploying such stations and many are in the planning stage.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EXAMPLES

Mass production electric vehicles (EVs) are coming on to the market during the next few years. Their adoption will depend on the availability of charging stations. A few cities have started deploying such stations and many are in the planning stage. Decision makers, including city governments, utilities, and/or private entities, such as mall and fast-food restaurant operators, are in need of information systems to assist them in deploying such an infrastructure, including (1) EV demand consideration, (2) actual location of stations, (3) implied service time on car owners, and (4) power grid implications. Certain examples address these aspects through analytical methodologies, such as discrete choice modeling, to capture the demand, optimization for actual location recommendations, and comprehensive simulations to estimate an overall impact on the system.

Certain examples relate to a roadway-powered electric vehicle system that includes a network of highways and roadways that include charging stations and associated infrastructure at select locations to facilitate electric vehicles that traverse the network of highways and roadways and receive/recharge their electrical operating power from the charging stations along the roadways.

In certain examples, a decision support system and service can be subscription based with a broad market spreading from city governments and municipalities (e.g., installing charging stations in public parking spaces, curbside charging, etc.), utilities, and private entities (e.g., retailers, mall operators, fast food and restaurant chains, garage owners, etc.). Using analytics for deployment of charging stations for EVs can help drastically reduce labor needs and open the door to more easily conduct what-if analyses, for example.

While certain examples focus on systems and associated methods for EVs, underlying concepts and methodologies are also applicable to deploying an infrastructure for other possible alternative fuel vehicles (e.g., compressed natural gas (CNG), hydrogen, biofuel stations, etc.).

Externally-powered EV's require their own power delivery system (e.g., electrified rails, electrified overhead wires, etc.) that forms an integral part of a roadway or route network. Examples of externally powered EV's include subways, overhead trolley systems, and electric rails (e.g., trains). Such externally-powered EV systems are in widespread use today as public transportation systems in large metropolitan areas. However, such systems typically require their own highly specialized roadway, or right-of-way, system, as well as the need for an electrical energy source, such as a continuously electrified rail or overhead wire, with which the EV remains in constant contact. These requirements make such systems extremely expensive to acquire, build and maintain. Moreover, such externally-powered EV systems are not able to provide the convenience and range of an internal combustion engine (ICE) automobile (which effectively allows its operator to drive anywhere there is a reasonable road on which the ICE vehicle can travel). Hence, while externally-powered EV systems, such as subway, trolley, and electric rail systems, have provided (and will continue to provide) a viable public transportation system, there is still a need for a zero-emission vehicle (ZEV) system that offers the flexibility and convenience of the ICE vehicle, and that is able to take advantage of the vast highway and roadway network already in existence used by ICE vehicles.

Rechargeable battery-driven EVs are characterized by having an electrical energy storage device onboard, e.g., one or more conventional electrochemical batteries, from which electrical energy is withdrawn to provide the power to drive the vehicle. When energy stored in the batteries is depleted, the batteries are recharged with new energy. Electrochemical batteries offer an advantage of being easily charged (using an appropriate electrical charging circuit) and readily discharged when powering a vehicle (also using appropriate electrical circuitry) without the need for complex mechanical drive trains and gearing systems. Charging stations can recharge electric vehicle batteries via a direct/contact charging connection, inductive coupling, etc.

A charging station infrastructure needs to be built from ground zero. Initial deployments in San Diego, San Francisco, and the Middle Tennessee Valley are relatively small. As EV adoption moves forward, more and more cities will start building extensive networks of charging stations where simple calculations will not provide robust and sustainable solutions. Without intelligent algorithms and processes, costly mistakes could be made, hindering a larger adoption of EVs with dire economic and environmental consequences. Currently at the forefront are utilities worrying about their distribution network and potential overload at substations.

Certain examples provide a method to generate a deployment plan for one or more electric vehicle charging stations. The example method includes gathering data for a specified geographic area and forecasting a demand for electric vehicles for the specified area. The example method includes modeling driving patterns in the specified area using available data and improving a charging infrastructure model based on the driving pattern and demand forecast information for the specified area. The example method includes generating and providing a recommendation regarding an electric vehicle charging infrastructure and deployment strategy for the specified area based on the improved charging infrastructure model.

Certain examples provide a computer readable storage medium including computer program code to be executed by a processor. The computer program code, when executed, is to implement a system to generate a deployment plan for one or more electric vehicle charging stations. The example system includes predictive analytics to receive a demand model constructed for electric vehicle demand in a specified area and information regarding location, driver habits and available power information to generate an electric vehicle charging station location plan for the specified area. The example system includes an optimizer to optimize the electric vehicle charging station location plan for the specified area based on driving pattern and electric vehicle demand forecast information for the specified area. The optimizer is to provide a deployment strategy for charging station locations in the specified area.

Certain examples provide a method of forecasting electric vehicle usage in a defined geographic area. The example method includes using an adoption forecasting model to forecast an electric vehicle allocation at a national level and determining an electric vehicle allocation at a state level using the electric vehicle allocation at the national level and one or more factors. The example method includes forecasting an electric vehicle allocation at a zip code level based on the electric vehicle allocation at the state level and one or more factors.

In certain examples, a charging station deployment strategy can be determined, evaluated, and modified. FIGS. 1, 2, 6, 7, and 8 represent flow diagrams representative of example machine readable instructions that can be executed to implement the example systems shown in FIGS. 3-4 and/or portions of one or more of those systems. The example processes of FIGS. 1, 2, 6, 7 and 8 can be performed using a processor, a controller and/or any other suitable processing device. For example, the example processes of FIGS. 1, 2, 6, 7 and 8 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 1, 2, 6, 7 and 8 can be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 1, 2, 6, 7 and 8 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 1, 2, 6, 7 and 8 can be implemented manually or as any combination(s) of any of the foregoing techniques, for example, any combination of firmware, software, discrete logic and/or hardware. Further, although the example processes of FIGS. 1, 2, 6, 7 and 8 are described with reference to the flow diagrams of FIGS. 1, 2, 6, 7 and 8, other methods of implementing the processes of FIGS. 1, 2, 6, 7 and 8 can be employed. For example, the order of execution of the blocks can be changed, and/or some of the blocks described can be changed, eliminated, sub-divided, or combined.

Additionally, any or all of the example processes of FIGS. 1, 2, 6, 7 and 8 can be performed sequentially and/or in parallel by, for example, separate processing threads, processors, devices, discrete logic, circuits, etc.

Figure 1:
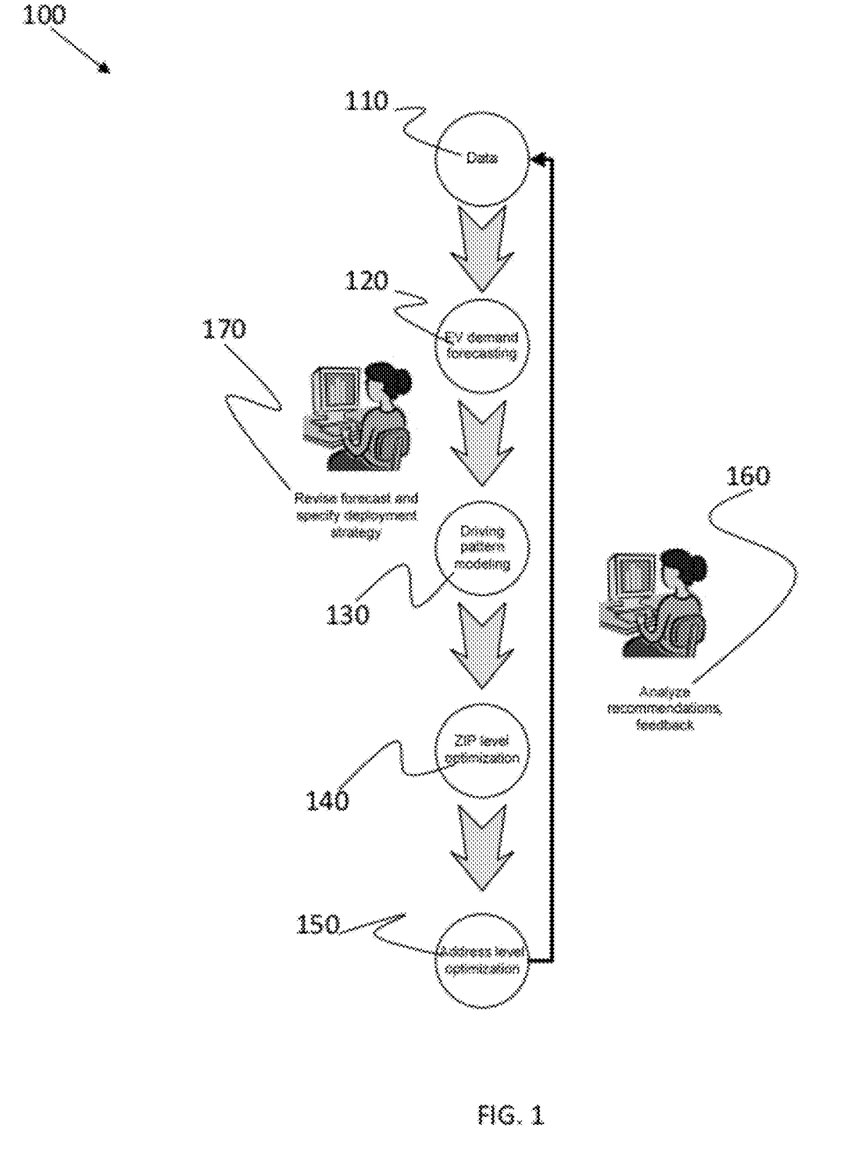
FIGS. 1-2 depict a flow diagrams for example methods for determining a charging station deployment strategy.

FIG. 1 depicts a flow diagram for an example method 100 for charging station deployment strategy evaluation. As shown in FIG. 1, at block 110, data, such as geographic data, demographics, power distribution grid, car sales, etc., is retrieved and/or provided for a certain geographic area (e.g., a certain selected zip code or set of zip codes, a state, a county, a city, etc.). At block 120, a demand for electric vehicles is forecast for the selected area. At block 130, driving patterns within the selected area are modeled based on the available data. At block 140, optimization is conducted to a charging infrastructure model based on the driving pattern and demand forecast information for the selected area (e.g., a selected zip code). At block 150, further local optimization is conducted (e.g., based on a certain address). Following optimization, at 160, recommendations are generated for a charging infrastructure and provided as feedback to the data 110. As the process repeats, at 170, a forecast can be revised and a charging station deployment strategy specified.

Figure 2:
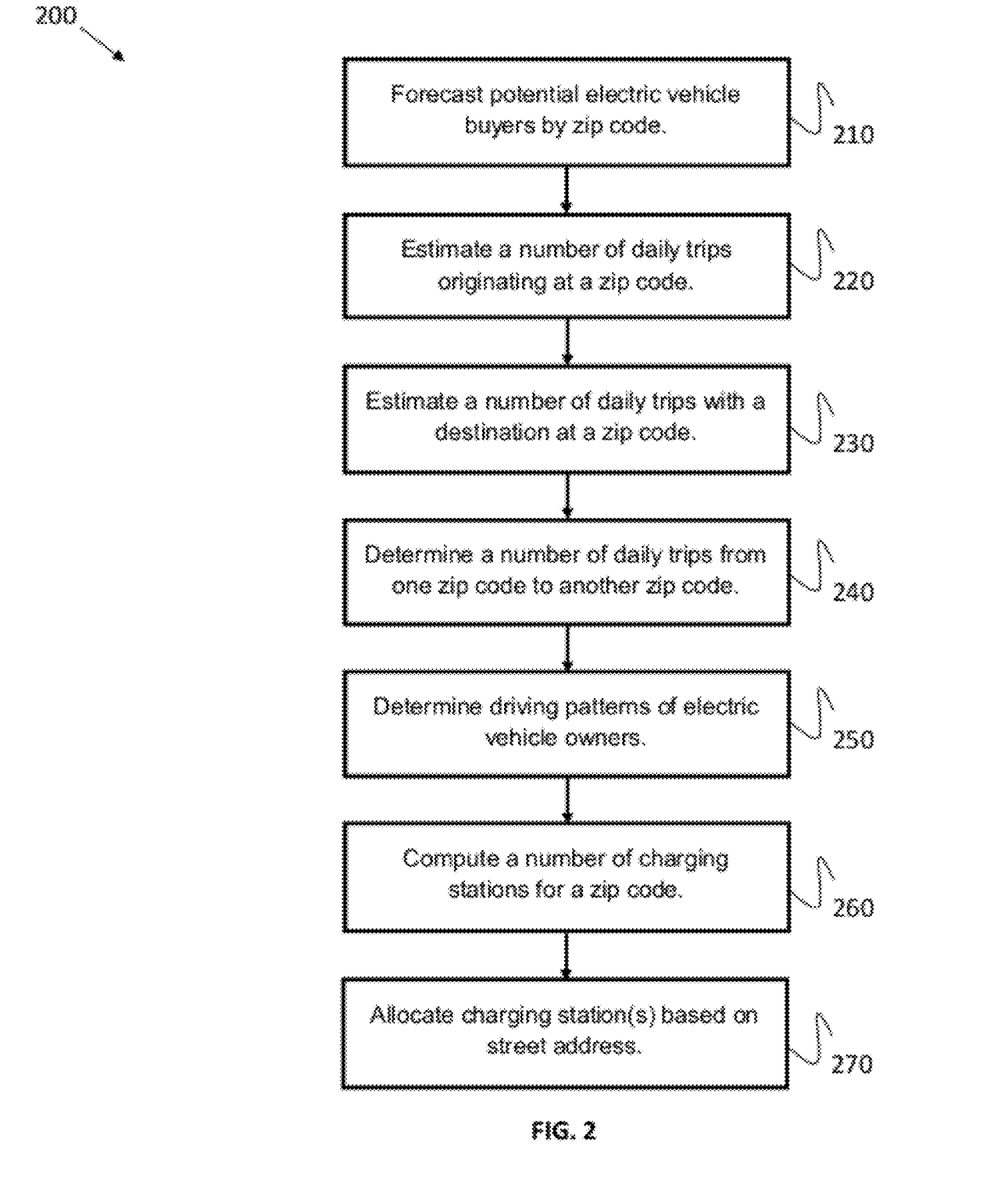

FIG. 2 depicts a flow diagram for an example method 200 for determining a charging station deployment strategy. The example method 200 of FIG. 2 identifies a number of charging stations that should be deployed in a particular geographical region (e.g., zip code regions are suitable since demographics data is available at this level).

At block 210, a number of potential EV buyers is forecast based on zip code. For example, by using sales of hybrid vehicles (e.g., Prius™ and other similar models), solar panel installations, and/or real time searches for specific keywords (e.g., 'electric vehicle,' 'plug-in hybrid', etc.), a forecast of potential EV buyers per zip code is calculated. Real time searches include tweets, Facebook™ posts, and/or other forms of social networking tools (e.g., obtained using Google™ Real Time Search service).

At blocks 220-240, driving patterns are modeled. At block 220, a number of daily trips originating at a zip code is estimated. For example, using a regression, a number of daily trips originating at each zip code under consideration is estimated. A regression model can be calibrated based on survey data (e.g., available for each major metropolitan area, and/or based on National Travel Survey Data for urban areas, etc.), and values of predictors are obtained from census data.

At block 230, a number of daily trips with a destination at a certain zip code are estimated. For example, using a regression, a number of daily trips with a destination at each zip code under review is estimated. The regression model is calibrated as in the previous bloc, for example. Values of predictors can be obtained by scrapping from an array or web of various factors such as a number of establishments, public garages, sport arenas, malls, etc., per zip code.

At block 240, a number of daily trips from one zip code to another zip code is determined. For example, using a gravity model, a number of daily trips from each zip code under consideration to each other zip code under consideration is forecast.

At block 250, driving patterns of EV owners are determined. For example, actual driving patterns of EV owners can be established. There will be a different driving pattern for each zip code, for example. A driving pattern is an anticipated number of trips originating at a zip code, following a particular sequence of different zip codes, and finishing back at the same zip code. A driving pattern determination relies on results obtained in blocks 220-240 and an average commute time and departure time at, for example, a town level, which is included in the census data.

At block 260, a number of charging stations for a zip code is computed. For example, given driving patterns or flows for each zip code, a number of charging stations that should be deployed in each zip code is determined. In certain examples, the number of charging stations is calculated using a mathematical programming optimization model that: 1) maximizes or increases a need of charging from EV owners based on the driving patterns and minimizes or reduces deployment cost; 2) takes into account the driving patterns; 3) considers the range of electric vehicles; and 4) takes into account the distribution power grid for the given area being reviewed. In certain examples, the mathematical model is solved using a solver. An example solver is a piece of mathematical software that solves a mathematical problem according to the model, for example.

As described above, blocks 210-260 determine a number of charging stations appropriate for each zip code and/or other area being reviewed. At block 270, charging station(s) are allocated based on street level address. For example, average traffic flow data and a recharging time offered by a charging station (e.g., Level 2 versus fast charging, etc.) can be used to allocate a number of charging stations for a zip code based on street level address information. A set of possible locations is specified in advance (e.g., all malls in the zip code, all coffee shop and/or restaurant locations in the zip code, all commercial office buildings in the zip code, etc.), and the optimization model determines a recommended or "best" set of locations by also considering additional information such as power grid substations and not overloading the available substation(s).

Figure 3:
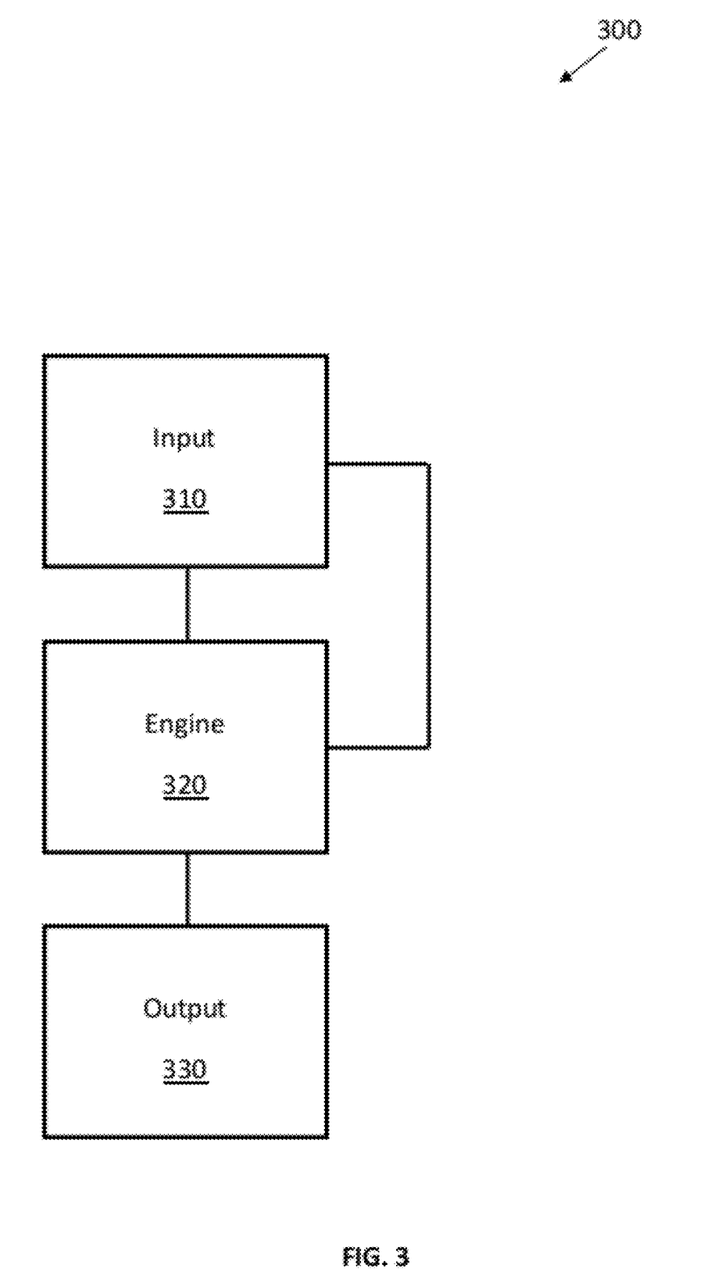
FIG. 3 depicts an example charging station infrastructure evaluation system.

FIG. 3 depicts an example charging station infrastructure evaluation system 300. The system 300 includes an information input 310, an evaluation engine 320, and a deployment output 330. The information input 310 receives information from one or more external systems and/or other sources of data (e.g., municipal data, census data, infrastructure data, demand data, geographic information, demographics, power distribution grid information, etc.).

The input is provided to the evaluation engine 320, which processes the input to generate a suggested, recommended, and/or possible deployment of charging station(s) in a given area. Deployment can be based on a variety of factors including demand, driving patterns, area infrastructure, area layout (e.g., roads, businesses, etc.), and/or other criterion(-ia). In certain examples, the engine 320 can tailor a deployment plan to a particular business strategy, such as a particular type of deployment (charging stations at retail malls, at electronics stores, at gas stations, etc.).

The deployment is provided by the engine 320 to the output 330. The deployment output 330 can generate one or more types of output with charging station deployment information, such as displayed output, printed output, transmitted output, output routed to another program, etc. Output can include charging station location(s), associated power grid load, etc.

In certain examples, the engine 320 can also provide feedback to the input 310 based on a generated deployment plan. The feedback can be used to adjust one or more of the input, for example.

Figure 4:
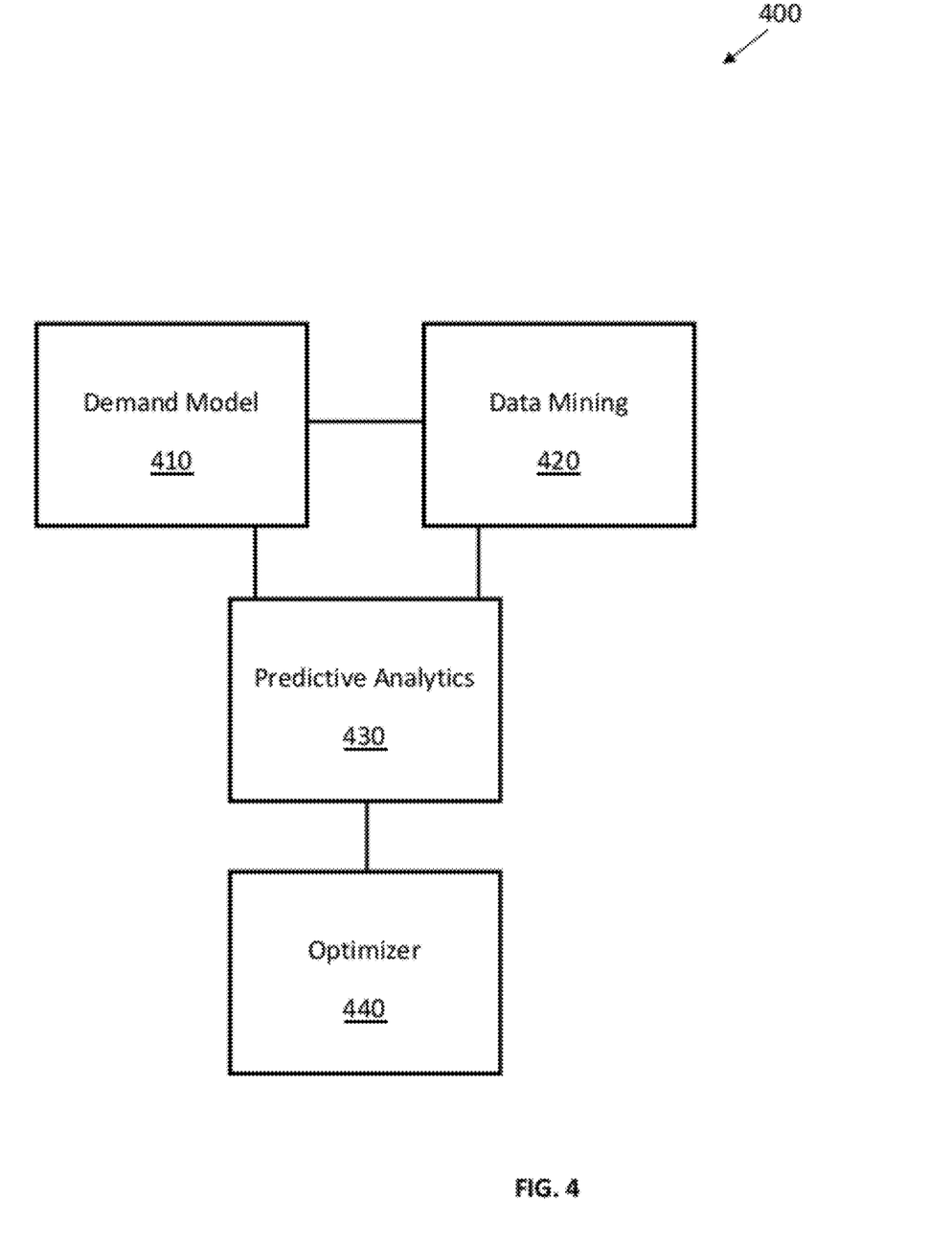
FIG. 4 depicts an example deployment optimization system for determining a charging station deployment strategy for electric vehicles.

FIG. 4 depicts an example deployment optimization system 400 for determining a charging station deployment strategy for electric vehicles. The system 400 includes a demand model 410, data mining 420, predictive analytics 430, and an optimizer 440. Based on information from the data mining 420, the demand model 410 constructs a model for EV demand in a given area. The demand model 410 and information such as station location, car owner service time, power grid information, etc., is provided to the predictive analytics 430 to generate a charging station location plan. The plan is optimized by the optimizer 440 and provided to a user and/or other system and/or application for review and/or further use, for example.

Figure 5:
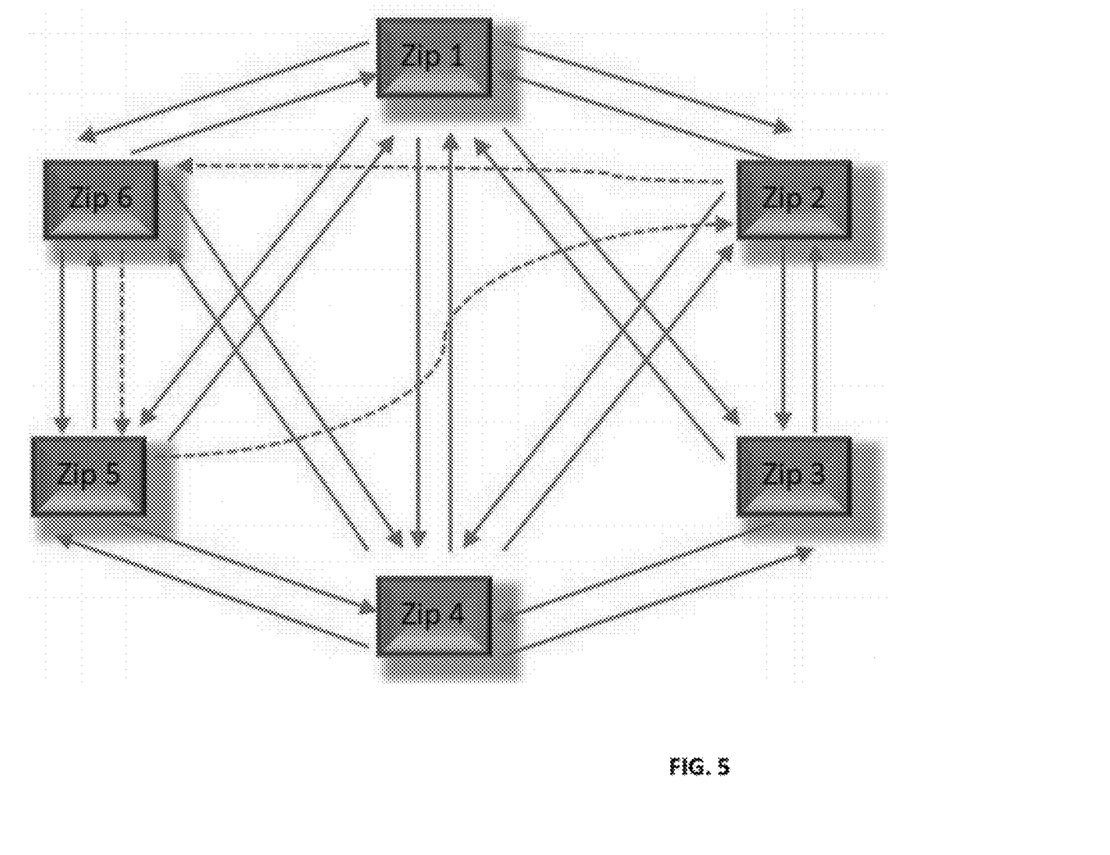
FIG. 5 shows a representation of an example deployment area using a route-based network including a set of nodes representing the zip codes or regions and a set of arcs to represent the distances among them.

Certain examples focus on solving the problem of optimally installing EV charging stations. Certain examples provide a two stage approach. In a first stage, a number of charging stations is determined based on zip code or region. A deployment area such as a metropolitan region is represented by a route-based network including a set of nodes representing the zip codes or regions (see, e.g., FIG. 5), and a set of arcs to represent the distances among them. This network accommodates possible routes covered by the householders within each region. This network may be referred to as the primary network. Based on the primary network, an improvement or optimization model increases or maximizes the number of drivers in need of charging stations with decisions being the number of charging stations per region. Only a limited number of charging stations are to be deployed.

In the second stage, each region is zoomed or magnified to review a region and allocate charging stations to specific locations within the region. These decisions are again based on an improvement/optimization model, which exploits average annual daily traffic numbers on major roads with a region, for example. In certain examples, since studying driving patterns within a zip code area or region may be difficult due to its small scale, traffic can be used as a proxy.

With EV infrastructure in a slow development phase, a limited number of options exist to recharge a battery. Current charging time is roughly 8-20 hours with a home-based socket, around 3 hours by using a Level 2 charging station, and 30 minutes with fast charging stations.

Assuming a plurality of EV types with specific driving ranges, a number of households owning EVs in each region can be determined using one or more forecasting techniques. For example, the forecasts are based on three factors: a number of hybrid car registrations, residential solar installations, and tweets on keywords 'electric vehicle,' 'plug-in hybrid,' and similar. These values are obtained at the zip code level. While the first two data streams are commercially available, proprietary techniques are used to collect the tweet-related data. A regression forecasting technique is used to combine these three factors and allocate them to each region, for example. Each charging station has a limited range to potentially serve all drivers going in and out from a region, including those who originate their trip from the same region, for example.

After obtaining the forecasts for the number of EV owners in each region, driving routes are obtained by studying driving patterns. Each route originates at a region and completes in the same region (e.g., it models a daily route from and back to the home of a driver). The routes are derived from several data sources whenever available: (1) extended surveys of household trips, (2) average daily commute time, (3) traffic volumes, and (4) other commercially available data sources. Each EV driver is allocated to a route based on traffic patterns. At the end of this phase, there is a set of routes in the primary network with each route having the underlying number of EV vehicles using this route (e.g., each EV vehicle has a driving range, which is dependent on the outside temperature).

Figure 6:
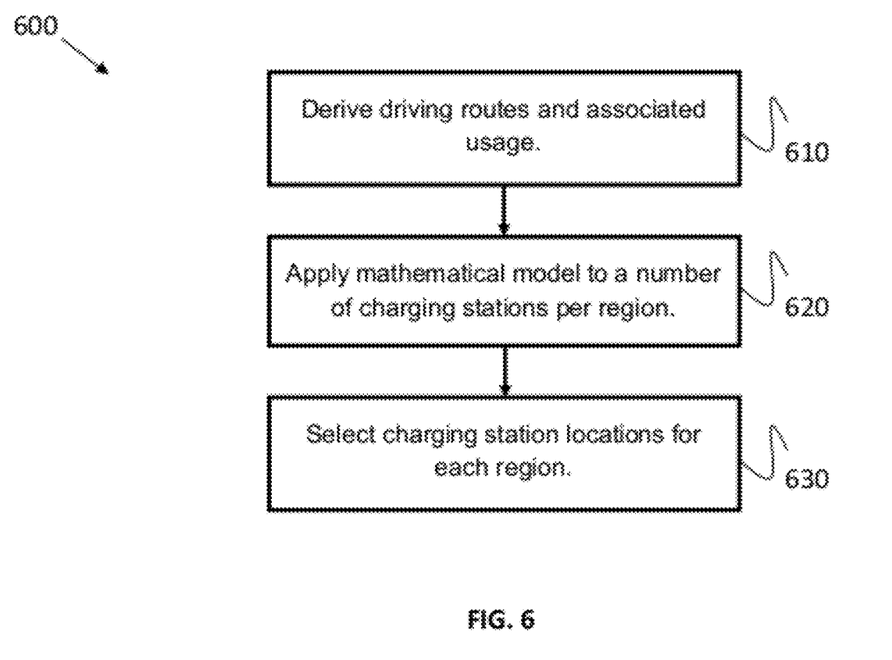
FIG. 6 illustrates a flow diagram for an example method to apply analytical methods to deploy a set of EV charging stations based on current and potential market demand.

In certain examples, analytical methods are used to deploy a set of EV charging stations such that current and potential market demand for charging are satisfied in the years ahead. As illustrated in FIG. 6, an example solution approach includes three main stages: 1) deriving driving routes and their usage (at block 610); 2) applying a mathematical programming model to efficiently provide a number of charging stations to be deployed in each region (at block 620); and 3) selecting, using a mathematical programming model, (exact) locations of charging stations for each region as provided by the previous stage (at block 630).

Vehicle range is a factor for determining the locations and number of charging stations for the householders to complete a round trip, especially a long-distance one. For purposes of example illustration only, the following route is assumed:

$$a \to 40 \text{ km} \to b \to 60 \text{ km} \to c \to 60 \text{ km} \to d \to 60 \text{ km} \to a,$$

where a, b, c, d are zip codes and a directed arrow followed by a number represents the distance to be covered to reach the next zip code.

For purposes of an example, assume there is only one EV traversing a route with a driving range of 100 km. The EV must reach at node c and, thus, a charging station must be located at node c to recharge the EV for another 100 km. When the EV arrives at node d from node c, the remaining charge is only enough for 40 km, and so the EV cannot reach the final destination before the battery completely discharges. Consequently, another charging station must be located at node d to recharge the EV so as to extend the travel distance at least 20 km to reach the final destination. As a result, two charging stations need to be sited, one at node c and the other at node d to recharge the EV for the complete journey, for example.

In certain examples, a mathematical formulation can be provided for a number of stations in each region. A first mathematical model ($M_1$) provides a number of charging stations to be deployed in each region. Model $M_1$ is based on the EV charging logic introduced above.

In an example, to formulate the mathematical model $M_1$, it is assumed that several types of EVs exist with a limited specific range, as well as a potential set of capacitated charging stations to be installed. Furthermore, each EV is assumed to be full of charge at the point of origin. If it is assumed that a household does not have a capability of home charging, the route is replicated several times so that charging occurs on the route (e.g., despite a potential low total length of the route).

Let $t \in T_m$ be an index of EV type t on route m. Then, $\beta_m^t$ and $f_m^t$ are a maximum driving range and flow (demand) of EV type t on route m. In an example deployment, stations are to be deployed at predetermined establishment types (e.g., grocery stores of a particular chain, sport arenas, malls). Each region has a limited number of establishment types. To this end, let L be a set of all establishment types and $p_{ji}$ a number of establishments of type j in region i. In addition, let $U_j$ be a maximum number of stations of establishment type j across all regions. The following set of decision variables are involved:

$$Y_{im}^t = \begin{cases} 1 \\ 0 \end{cases}$$

if an EV of type t is recharged at node i on route m otherwise;

$$Z_m^t = \begin{cases} 1 \\ 0 \end{cases}$$

if demand of EVs of type t on route m is met otherwise;

$$Q_i = \begin{cases} 1 \\ 0 \end{cases}$$

if there is at least one charging station at node i otherwise;

$X_i$=number of EV charging stations to be located in region i;

$P_{ji}$=number of EV charging stations to be located in region i of establishment type j;

$B_{im}^t$=amount of charge remaining at site i for an EV of type t on route M;

$R_{im}^t$=amount of recharge at site i for an EV of type t on route m.

$M_1$ can then be formulated as follows:

$\mathcal{M}_1$ can then be formulated as follows:

$$M_1: \max \sum_{m \in M} \sum_{t \in T_m} f_m^t Z_m^t \quad (1)$$

Subject to:

$$B_{im}^t = (B_{jm}^t + R_{jm}^t) - d_{ji}, \forall (j, i) \in A_{r(m)}, m \in M, t \in T_m \quad (2)$$

$$R_{im}^t + B_{im}^t \le \beta_m^t, \forall m \in M, i \in V_{r(m)}, t \in T_m, \quad (3)$$

$$R_{im}^t \le \beta_m^t Y_{im}^t, \forall m \in M, i \in V_{r(m)}, t \in T_m, \quad (4)$$

$$\sum_{(m \in M | i \in V_{r(m)})} \sum_{t \in T_m} f_m^t Z_m^t \le \lambda X_i, \forall i \in V, \quad (5)$$

$$X_i = \sum_{j \in L} P_{ji}, \forall i \in V. \quad (6)$$

$$P_{ji} \le \rho_{ji} Q_i, \forall j \in L, i \in V, \quad (7)$$

$$\sum_{i \in V} P_{ji} \le U_j, \forall j \in L, \quad (8)$$

$$(1 - Y_{im}^t) + Q_i \le Z_m^t, \forall m \in M, i \in V_{r(m)}, t \in T_m, \quad (9)$$

$$B_{im}^t, R_{im}^t \ge 0, Y_{im}^t \in \{0, 1\}, \forall m \in M, i \in V_{r(m)}, t \in T_m, \quad (10)$$

$$B_{0m}^t = \beta_m^t, \forall m \in M, t \in T_m, \quad (11)$$

$$X_i \ge 0, Q_i \in \{0, 1\}, \forall i \in V, \quad (12)$$

$$Z_m^t \in \{0, 1\}, \forall m \in M, t \in T_m, \quad (13)$$

where M is a set of all routes in the network; V is a set of all regions or nodes; $V_{r(m)} \subseteq V$ is a subset of nodes on route m; A is a set of arcs; $\lambda$ is a positive integer that imposes an upper bound on the number of EVs that can be recharged within a given region; and $d_{ij}$ is a distance between nodes i and j.

The objective function increases or maximizes the number of EVs that can transit their routes without being stranded on the route due to a completely discharged battery. The constraints capture the limited driving range of vehicles and other business goals/requirements.

A second model ($M_2$) allocates exact sites for a number of EV charging stations provided by $M_1$. Model $M_2$ aims to determine an exact location of EV charging stations within each region such that an EV charging station service is maximized or improved based on traffic on arterial roads.

The following indexes, sets, parameters, and decision variables are used. Example parameters include:

$P_{ji}$=Number of EV charging stations to be opened within region i of establishment type j
this is the output of model ($\mathcal{M}_1$);

J=Set of potential charging station sites;

$Z_{ji}$=Subset of potential EV charging station locations in region i of establishment type j,
with $$\bigcup_{i \in I, j \in L} Z_{ji} = J$$

$\delta$=Universal lower bound on the distance between any two locations that are sited (stations should be located at least this many distance units apart);

$a_j$=Average traffic of the nearest arterial road to site j;

$d_j$=Distance of the closest arterial road to location j;

P=Universal service range of charging stations;

Example decision variables include:

$$x_j = \begin{cases} 1 \\ 0 \end{cases}$$

if a charging station is sited at node j∈J otherwise.

Model $M_2$ is formulated as follows:

$$M_2: \max \sum_{j \in J} a_j x_j \quad (14)$$

Subject to:

$$\sum_{k \in Z_{ji}} x_k = P_{ji}, \forall i \in V, j \in L \quad (15)$$

$$x_j + x_k \le 1, \forall j, k \text{ with } dist(j, k) \le \delta \quad (16)$$

$$\sum_{j \in \cup_k Z_{ki}} d_j k_j \le P, \forall i \in I \quad (17)$$

Here, dist represents a distance between two locations. Equation 14 represents an objective function to be increased or maximized as a sum of nearby traffic. Equation 15 imposes a number of stations of each establishment type in each region. Equation 16 imposes a minimum distance between two EV charging station locations. Equation 17 enforces that, in a solution, a distance of locations selected to arterial roads does not exceed P.

An aspect in site selection of charging stations is forecasting of future owners of EVs and their driving patterns at a micro level (e.g., zip codes). Such approaches are to be robust, easily applicable to any part of the US and not using 'fudge' factors or weights, such as the value of a hybrid car versus a solar panel as indicators for willingness to buy an EV.

An example forecasting methodology is based on proportionally assigning the total national production capacity of EVs to each zip code in the US. The proportion depends on several factors. A user does not have to weigh the factors; it suffices to prioritize the factors. Another challenge is how to forecast a number of vehicles of a certain type. An indicator there is a commute distance, with logic being that owners will buy vehicles to suit their needs. For example, if someone commutes 40 miles per day, then there is no need to buy an EV with a range of more than 40 miles.

This approach provides:
1) a high level framework of proportionally assigning a total production capacity to each zip code,
2) use of solar residential installations and tweets as indicators for EV adoption, and
3) prioritization of indicators as opposed to weighing them together with underlying optimization/improvement models.

In addition to forecasting of EVs, a model is also used generate underlying driving routes of EV owners. This approach is robust and easily scalable to the entire US.

Public data is available regarding the number of residents of a given zip code working in a different zip code. Certain examples randomly construct driving routes by proportionally at random selecting a working zip code for residents of a zip code. A route is then constructed by finding shortest paths between the origin zip code and the work location. The commute from work to home is also extended by other locations (e.g., after-work errands). These errands-related locations are driven by road traffic among zip codes.

Let $A_t$ be a production plan/capacity for all EVs with a given range in future year t (or alternatively, they can be derived from an adoption forecasting model such as a Bass Diffusion model or other Riccati equation). For the next five years, all of the car manufacturers have released such numbers. Let $f_{ti}$ be a forecasted quantity for year t and zip code i. For simplicity, a time indicator for the current year can be omitted.

An example forecasting methodology maintains $1=\Sigma_i f_{ti}$ with an actual forecasting quantity being $A_t f_{ti}$. Three indicators are used to drive adoption of EVs: historical purchases of hybrid vehicles (such as a Prius™), residential solar installations in a zip code, and Twitter™ and/or other social media/messaging accounts registered in a zip code who tweet on specific EV related keywords (e.g., 'electric vehicle,' 'PHEV', etc.).

Let $h_i$, $s_i$, $t_i$ be a fraction of hybrid sales, solar installations, and Twitter™ accounts in zip code i versus a national total, respectively. These can be combined to forecast as $h_i + w_1 s_i + w_2 t_i$. Computation of weights $w_1$, $w_2$ can be based on a principle of preferences of the three indicators $h_i$, $s_i$, $t_i$. A user specifies their order (e.g., hybrid sales being the most important indicator, solar installation as the second one, and tweets as the third indicator). In addition, the user specifies a forecasting error around the two top indicators, denoted by $\delta_h$, $\delta_s$. A forecast indicator $f_i$ can be obtained for a current year within a range $[(1-\delta_h)h_i, (1+\delta_h)h_i]$. Among possible values, zip codes with a higher number of solar installations can receive a higher forecast value $f_i$ and aims to be as close to $s_i$ as possible. The following example model achieves these two objectives:

$$\alpha = \min_{w_1 \geq 0, w_2 \geq 0} \sum_i \|h_i + w_1 s_i + w_2 t_i - c_s s_i\| \quad (18)$$

$h_i + w_1 s_i + w_2 t_i \leq (1 + \delta_h) h_i$ for every $i$.

In Equation 18, $C_s$ is a conversion factor between hybrid sales and solar installations which is set to be the average ratio $h_j/s_j$ over all zip codes in a deployment region under consideration. An objective value reduces or minimizes deviation from a solar installation indicator, while constraints help guarantee that a forecast $h_i + w_1 s_i + w_2 t_i$ remains within an acceptable limit from a hybrid sale number. If $h_i = 0$, then a percentage of the average hybrid sales across the forecasting region is taken as the left-hand side of the equation.

Next, similar logic is used, except that the analysis is calibrated with respect to a number of tweets and deviation from solar forecasts $\alpha$ is added.

$$\min_{w_1 > 0, w_2 > 0} \sum_i \|h_i + w_1 s_i + w_2 t_i - c_t t_i\| \quad (19)$$

$h_i + w_1 s_i + w_2 t_i \leq (1 + \delta_h) h_i$ for every $i$ $\sum_i \|h_i + w_1 s_i + w_2 t_i - c_s s_i\| \leq \alpha(1 + \delta_s).$ This is a so-called second order cone program which is computationally tractable. A solution to this model provides final weights $w_1$, $w_2$ that combine the three indicators.

Then, for each historical year, a weighted value $u_i$ of zip code i of the indicators can be calculated as $u_i = h_i + w_1 s_i + w_2 t_i$. A proportion of the overall forecast is then $$p_i = \frac{u_i}{\Sigma_j u_j}.$$

This quantity is computed for each historical year, and then a regression based model is developed to forecast these proportions in subsequent years within a planning horizon to derive values $f_{ti}$. Note that these values can also be computed at the state level based on the above principles.

These proportions do not yet provide forecasts at a vehicle range level. A national forecast for year $A_t$ (e.g., either obtained from production schedules or a Bass Diffusion model) and zip level proportions $f_{ti}$ can be combined into a range-level forecast. For purposes of illustration in the following non-limiting example, it is assumed that future year t is fixed, and, thus, this subscript is omitted for purposes of simplicity.

In order to differentiate by vehicle range, total sales are allocated to each state based on an average commute distance at each state. As illustrated, for example, in FIG. 7, state values are then divided among the zip codes again based on commuting distances at the zip level.

Figure 7:
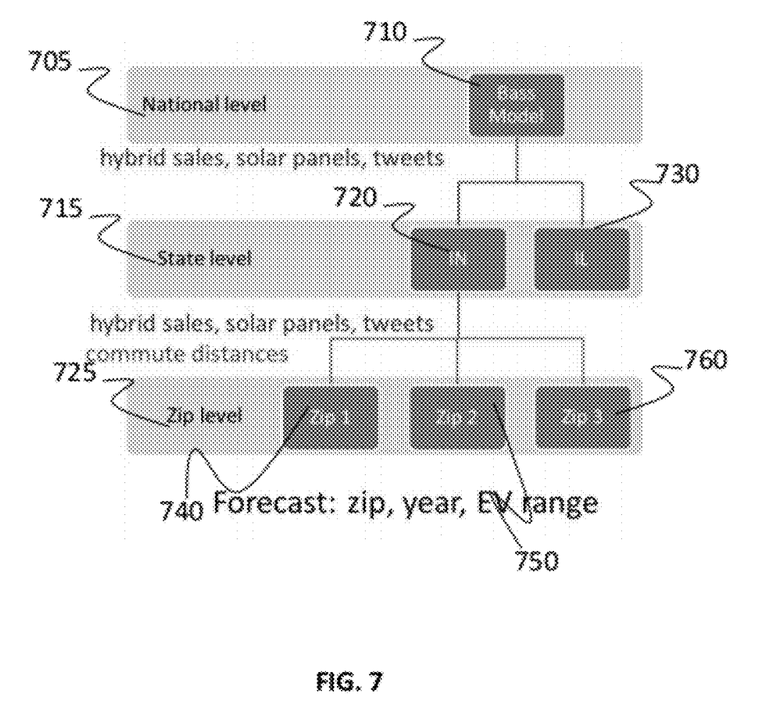
FIG. 7 shows an example forecast of charging station allocation at national, state, and zip levels.

As shown in FIG. 7, at block 705, a Bass diffusion model 710 is used to forecast an allocation at a national level. One or more factors including hybrid vehicle sales, solar panels, tweets, etc., can be used to feel the model 710 to determine a national level allocation. At block 715, an allocation at a state level is determined. One or more states 720, 730 can be associated with a forecast allocation based on one or more factors including hybrid vehicle sales, solar panels, tweets, etc. At block 725, a zip level allocation is forecast. For example, each of a plurality of zip codes 740, 750, 760 can be forecast based on commute distance, etc.

Details on state level disaggregation are provided next. Let $r_k$ be a range of vehicle type k and $H_k$ a forecasted number of vehicles at the national level or range $r_k$ $$\left(e.g., A = \sum_k H_k\right).$$

These values can either be based on the forthcoming vehicles or just equidistant range buckets, for example. Let $x_{sk}$ be an overall market allocated to state s and range $r_k$. Let $\beta_{ks}$ be a proportion of state s of all national commuters that commute $r_k$. These values can be derived from census data, for example. Ideally, $x_{sk} = H_k \beta_{ks}$, but this result might not be possible to achieve due to the different appetite for electric vehicles at the state level. Certain examples operate under the following constraint:

$$\sum_s x_{sk} = H_k \text{ for every } k. \quad (20)$$

On the other hand, a total allocation to state s is $p_s A$, which is expressed by $$\sum_k x_{sk} - p_s A \text{ for every state } s. \quad (21)$$

The example model has an objective of $x_{sk}$ being close to $H_k \beta_{ks}$. An example complete model reads $$\min_x \sum_{s,k} (x_{sk} - H_k \beta_{ks})^2 \quad (22)$$

subject to constraints (20) and (21). An overall number of vehicles allocated to state s of range $r_k$ is $x_{sk}H_k$.

The numbers are then allocated at the zip code level. Let state s be given. The model is similar to the above. Let $\alpha_{ki}$, be a proportion of commuters in zip code i whose commuting distance is $r_k$. These values can again be obtained from census data, for example. If $y_{ki}$ is a number of vehicles of range $r_k$ in zip code i, then an example final model reads:

$$\min_y \sum_{k,i} (y_{ki} - H_k x_{ks} \alpha_{ki})^2 \quad (23)$$

$$\sum_i y_{ki} = H_k x_{ks} \text{ for every } k$$

$$\sum_k y_{ki} = p_i \sum_k H_k x_{ks} \text{ for every } i.$$

The final forecasted value for zip code i and range $r_k$ is $H_k x_{ks} y_{ki}$. In practice, for large states this model is hard to solve due to the large number of zip codes. An approximate solution is derived by aggregating all zip codes in the state not under consideration as a single region, for example.

Figure 8:
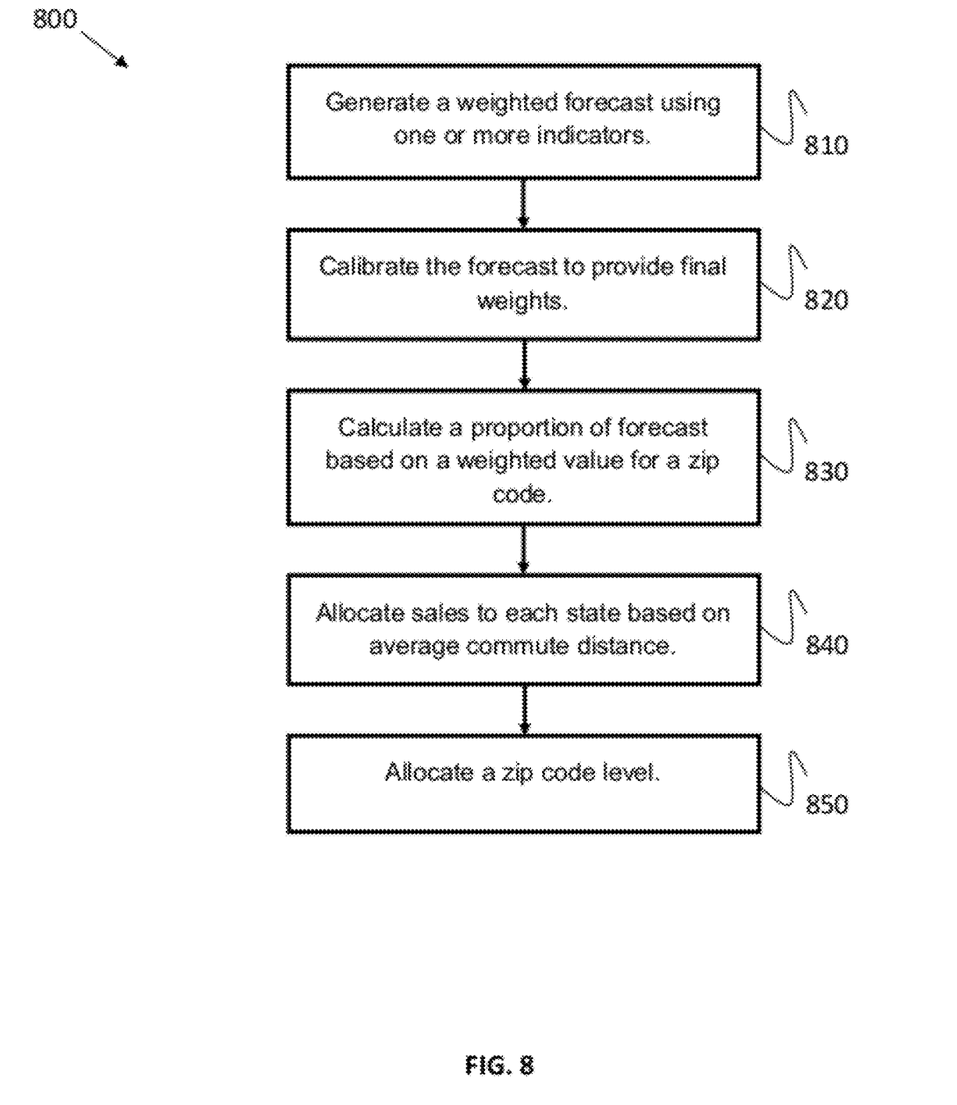
FIG. 8 illustrates a flow diagram of an example method of forecasting future owners of EVs and associated driving patterns.

FIG. 8 illustrates a flow diagram of an example method of forecasting future owners of EVs and associated driving patterns. At block 810, a weighted forecast of activity in a given zip code is generated using one or more indicators. For example, weighted information regarding hybrid sales, solar installations, social networking/messaging accounts, etc., can be used to provide a forecast indicator for a given zip code and year. Weights can be based on one or more preferences, for example.

At block 820, the forecast analysis is calibrated with respect to one or more of the indicators to provide final weights to be used in the forecast. At block 830, a proportion of an overall forecast is calculated based on weighted value for a zip code for the given factors. At block 840, total vehicle sales are allocated to each state based on an average commute distance at each state. At block 850, numbers are then allocated at the zip code level.

While example systems have been illustrated in FIGS. 3-4, one or more of the elements, processes and/or devices illustrated in FIGS. 3-4 can be combined, divided, re-arranged, omitted, eliminated and/or implemented in any other way. Further, one of the more of the elements, processes and/or devices illustrated in the systems 300, 400 of FIGS. 3-4, and/or, more generally, the example systems 300, 400 of FIGS. 3-4 can be implemented by hardware, software, firmware and/or any combination of hardware, software and/or firmware. Thus, for example, any of the elements, processes and/or devices illustrated in the systems 300, 400 of FIGS. 3-4, and/or, more generally, the example systems 300, 400 of FIGS. 3-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the components of FIGS. 3 and/or 4 is hereby expressly defined to include a computer readable medium such as a memory, DVD, CD, Blu-ray, etc., storing the software and/or firmware. Further still, the example systems 300, 400 of FIGS. 3-4 can include one or more elements, processes and/or devices in addition to, or instead of, those illustrated in FIGS. 3-4, and/or can include more than one of any or all of the illustrated elements, processes and devices.

Figure 9:
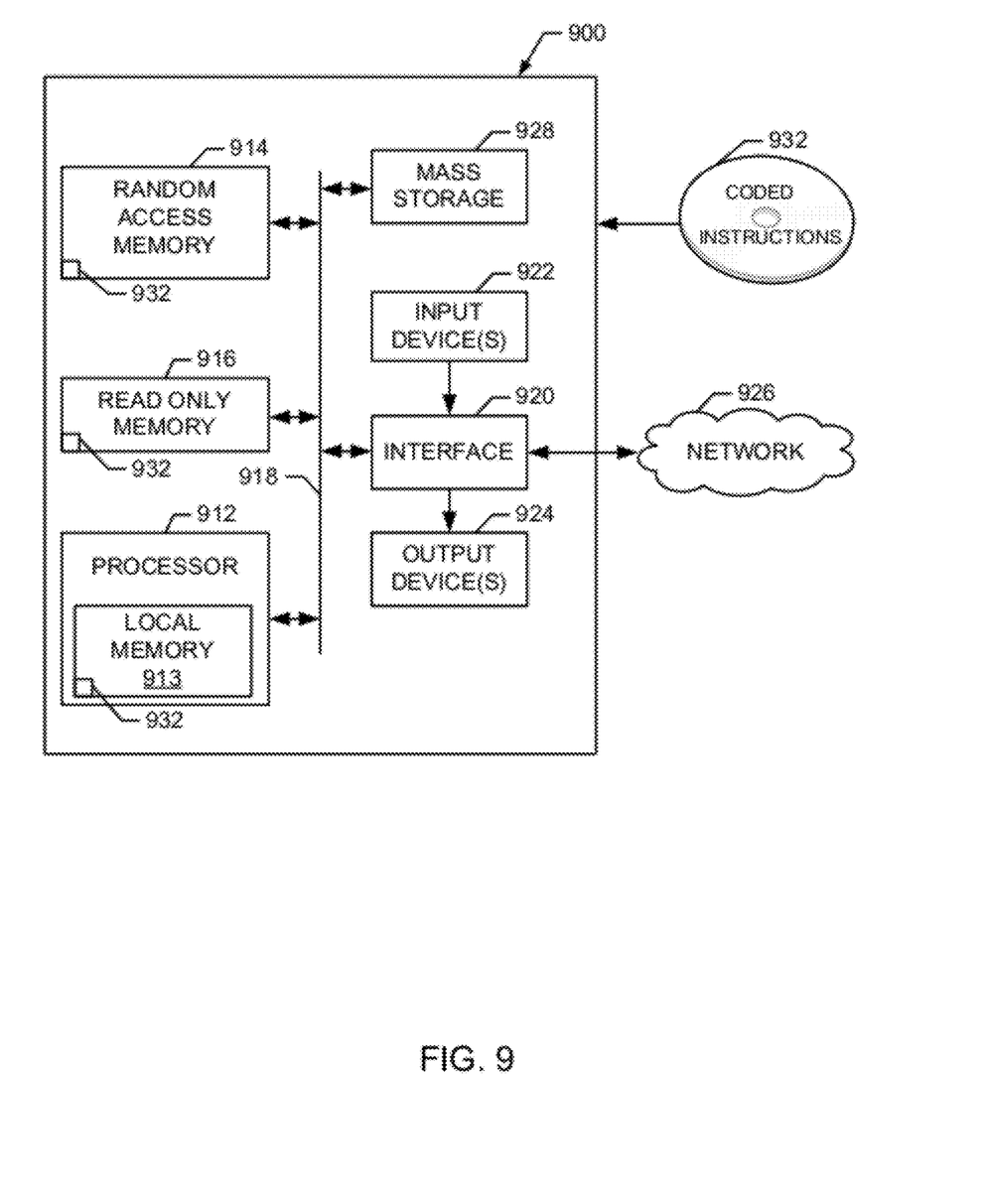
FIG. 9 is a block diagram of an example computer or other processor system that can be used to implement systems, apparatus, and methods described herein.

FIG. 9 is a block diagram of an example processor platform that may be used to execute systems, methods and apparatus described herein. The processor platform 900 of the instant example includes a processor 912. For example, the processor 912 can be implemented by one or more microprocessors or controllers from any desired family or manufacturer. The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), etc.). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement a local storage device.

The coded instructions 932 of FIGS. 1, 2, 6, 7, and/or 8 may be stored in the mass storage device 928, in the volatile memory 914, in the non-volatile memory 916, and/or on a removable storage medium such as a CD, Blu-Ray, or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to generate a deployment plan for one or more electric vehicle charging stations, the method comprising:

gathering, using a processor, data for a specified geographic area, the gathered data including data regarding daily trips by a modeled driver from an origin to a destination in the specified geographic area;

forecasting, using the processor, a demand for electric vehicles for the specified geographic area using the gathered data;

modeling, using the processor, driving patterns in the specified area using the gathered data to create a driving pattern model;

improving, using the processor, a charging infrastructure model based on the driving pattern model and demand forecast information for the specified geographic area; and generating and outputting, using the processor, an electric vehicle charging infrastructure and deployment plan for the specified geographic area based on the improved charging infrastructure model, the improved charging infrastructure model comprising computation of a combination of i) a number of electric vehicle charging stations to be deployed in the specified geographic area, ii) a set of potential charging station sites, iii) average traffic of a nearest arterial road to each of the set of potential charging station sites, and iv) a distance of the nearest arterial road to each of the set of potential charging stations sites, evaluated with respect to a decision variable, the deployment plan to allocate electrical vehicle charging stations at street address locations in the specified geographic area.

2. The method of claim 1, wherein the specified geographic area comprises a selected zip code.

3. The method of claim 2, wherein modeling further comprises modeling driving patterns in the specified geographic area based on at least one of daily trips originating at the zip code and daily trips arriving at the zip code.

4. The method of claim 3, wherein modeling further comprises applying a regression model to the daily trips information, the regression model calibrated based on survey data.

5. The method of claim 1, wherein improving the charging infrastructure model comprises locally optimizing the charging infrastructure model based on address.

6. The method of claim 1, wherein forecasting further comprises:
deriving driving routes and usage within the specified geographic area;
applying a mathematical programming model to provide the number of charging stations to be deployed in the specified geographic area; and
selecting, using the mathematical programming model, locations of charging stations for the specified geographic area.

7. The method of claim 1, further comprising revising the forecast.

8. A computer readable storage medium including computer program code to be executed by a processor, the computer program code, when executed, to implement a system to generate a deployment plan for one or more electric vehicle charging stations, the system comprising:
predictive analytics to receive a demand model constructed for electric vehicle demand in a specified geographic area and information regarding location, driving pattern, and available power information to forecast electric vehicle demand for the specified geographic area using the demand model and information and to generate an electric vehicle charging station location plan for the specified geographic area, the driving pattern including data regarding daily trips by a modeled driver from an origin to a destination in the specified geographic area forming a driving pattern model; and an optimizer to optimize the electric vehicle charging station location plan for the specified geographic area based on the driving pattern model and electric vehicle demand forecast information for the specified geographic area, the optimizer to generate and output a deployment strategy for charging station locations in the specified geographic area based on computation of a combination of i) a number of electric vehicle charging stations to be deployed in the specified geographic area, ii) a set of potential charging station sites, iii) average traffic of a nearest arterial road to each of the set of potential charging station sites, and iv) a distance of the nearest arterial road to each of the set of potential charging stations sites, evaluated with respect to a decision variable, the deployment strategy to allocate electrical vehicle charging stations at street address locations in the specified geographic area.

9. The computer readable storage medium of claim 8, wherein the predictive analytics forecast demand for electric vehicles in the specified geographic area by:
deriving driving routes and usage within the specified geographic area;
applying a mathematical programming model to provide the number of charging stations to be deployed in the specified geographic area; and
selecting, using the mathematical programming model, locations of charging stations for the specified geographic area.

10. The computer readable storage medium of claim 8, wherein the specified geographic area comprises a selected zip code.

11. The computer readable storage medium of claim 8, wherein the driving patterns are to be modeled by applying a regression model to daily trip information, the regression model calibrated based on survey data.

12. The computer readable storage medium of claim 8, wherein the electric vehicle demand forecast information comprises:
a high level framework of proportionally assigning a total production capacity to the specified geographic area,
solar residential installations and media messages organized as indicators of electric vehicle adoption, and
prioritized indicators of electric vehicle usage.

13. A method of forecasting electric vehicle usage in a defined geographic area, the method comprising;
using an adoption forecasting model to forecast an electric vehicle allocation at a national level;
determining a forecast for an electric vehicle allocation at a state level using the electric vehicle allocation forecast at the national level and one or more factors;
forecasting an electric vehicle allocation at a zip code level based on the electric vehicle allocation at the state level and the one or more factors including driving pattern information within the zip code, maximum electric vehicle driving range, and charging ability of an electric vehicle charging station, the driving pattern information forming a driving pattern model; and
allocating charging stations with a street address location for each charging station in the defined geographic area using the electric vehicle allocation and the driving pattern model.

14. The method of claim 13, wherein the adoption forecasting model comprises a Bass diffusion model.

15. The method of claim 13, wherein the one or more factors include hybrid vehicle sales, solar panels, and online messages, the one or more factors to be input into the adoption forecasting model to determine a national level electric vehicle allocation.

16. The method of claim 13, wherein the one or more factors used to determine the state level electric vehicle allocation includes hybrid vehicle sales, solar panel installations, and social media messages.

17. The method of claim 13, wherein each of a plurality of zip codes is forecast based at least in part on commute distance.

18. The method of claim 13, wherein forecasting further comprises;
generating a weighted forecast of activity in a selected zip code;
calibrating a forecast analysis with respect to one or more of indicators to provide a calibrated weighted forecast;
calculating a proportion of an overall forecast based on the weighted forecast value for the selected zip code;
allocating total electric vehicle sales to one or more states based on an average commute distance in each state and then allocating total electric vehicle sales at the zip code level.

19. The method of claim 13, wherein the predictive analytics forecast demand for electric vehicles in the defined geographic area, forecasting comprising:
deriving driving routes and usage within the defined geographic area;
applying a mathematical programming model to provide a number of charging stations to be deployed in the defined geographic area; and
selecting, using the mathematical programming model, locations of charging stations for the defined geographic area.

20. A computer readable storage medium including computer program code to be executed by a processor, the computer program code, when executed, to implement a system to generate a deployment plan for one or more electric vehicle charging stations, the system comprising:
predictive analytics to receive a demand model constructed for electric vehicle demand in a specified area and information regarding location, driver habits and available power information to generate an electric vehicle charging station location plan for the specified area using the demand model and information; and
an optimizer to optimize the electric vehicle charging station location plan for the specified area based on a driver habit model and electric vehicle demand forecast information for the specified area, the optimizer to generate and output a deployment strategy for charging station locations in the specified area, the deployment strategy to allocate electrical vehicle charging stations at street address locations in the specified geographic area,
wherein the electric vehicle demand forecast information comprises:
a high level framework of proportionally assigning a total production capacity to the specified area,
solar residential installations and media messages organized as indicators of electric vehicle adoption, and
prioritized indicators of electric vehicle usage.

\* \* \* \* \*